(No Model.)
O. R. CHAPLIN.
Device for Cutting Shoe Nails.
No. 238,571.   Patented March 8, 1881.
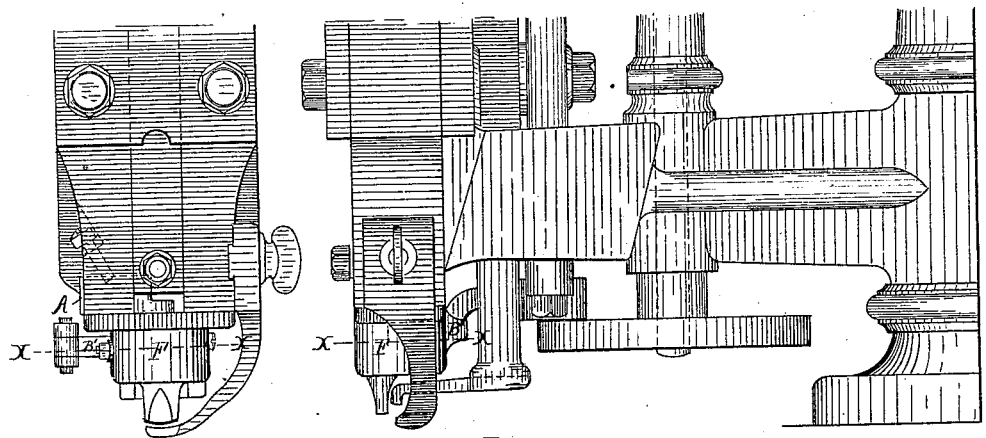

United States Patent Office.

ORRIL R. CHAPLIN, OF BOSTON, MASSACHUSETTS, ASSIGNOR TO THE FLEXIBLE SHOE FASTENING MACHINE COMPANY.

DEVICE FOR CUTTING SHOE-NAILS.

SPECIFICATION forming part of Letters Patent No. 238,571, dated March 8, 1881.

Application filed December 1, 1880. (No model.)

*To all whom it may concern:*

Be it known that I, ORRIL R. CHAPLIN, of Boston, in the county of Suffolk and State of Massachusetts, have invented an Improved Device for Cutting Shoe-Nails, of which the following is a full, clear, concise, and exact description, reference being had to the accompanying drawings, making a part hereof, in which—

Figure 1 is a front view of the lower part of a nailing-machine, showing the attachment of my improved cutters. Fig. 2 is a side view of the same. Fig. 3 is a plan of my cutters with the carrier and connections. Fig. 4 is a section on line *y y* of Fig. 6. Fig. 5 is a section on line *x x* of Fig. 1. Figs. 6, 7, and 8 are details of the under cutters. Fig. 9 is a diagram for illustration. Fig. 10 is a detail, showing the upper cutter. Fig. 11 shows the form of the nail.

My invention relates to mechanism for forming shoe-nails from wire or wire-like material by cutting off a section of the wire long enough for the nail-driver, and cutting away portions of this section to give the nail the desired form.

The mechanism shown in the drawings is adapted for application to a nail-driving machine, and to make shoe-nails of the form shown in Fig. 11 of the drawings, which is fully described in an application for a patent filed by me and now pending.

The parts not lettered will be understood by all skilled in the art without description, as they show portions of the head, shoe-feed, edge-guide, and other parts of a well-known form of nail-driving machine, described in my Patent No. 231,149, dated August 17, 1880.

The upper cutter, A, (shown in detail in Fig. 10,) has two holes, *a a'*, through it, the hole *a* receiving the wire from the wire-feeding mechanism, and the hole *a'* receiving the driver. This is not new, and is fully described in my patent above referred to.

One of the under cutters, B, (shown in detail in Fig. 8,) has a groove, *b*, formed in one face, which is of the size and shape of the wire, except where the wire is to be cut away, and the other under cutter, D, has a groove, *d*, formed in it, the counterpart of groove *b*, these two grooves when brought together forming a receptacle for the wire. The upper surface of the cutter B forms, with the lower surface of the cutter A, a pair of shears for severing the wire, it being understood that when the wire is fed into the device the groove *b* is in line with the hole *a* of cutter A, so that a portion of the wire of the desired length projects through hole *a* into the receptacle formed by the grooves *b* and *d*, which are together when the wire is fed. When in this position, with a portion of the wire protruding through hole *a* into the chamber *b d*, a movement of the cutter B to carry groove *b* toward groove *d'* of cutter D will sever that portion of the wire in chamber *b d* from that portion in hole *a*, and will also cut away from the severed portion so much of the wire as is in groove *d*, leaving the severed portion in groove *d* and carrying the remainder (which is then the shoe-nail shown in Fig. 11) into the chamber formed by the grooves *b* and *d*, which together make a groove of the shape of the wire section before a portion of it was cut away by the edge of groove *d*. The driver then descends, forcing the finished nail from the chamber forward of the grooves *b* and *d'*. The cutter A is then moved back to bring groove *b* into proper relation with groove *d*, the wire fed forward again, so that a portion of it will protrude into the chamber formed by the grooves *b d*, and the operation repeated, a nail being formed by simply feeding the wire through the upper cutter and into the chamber formed by the groove *b d*, and then moving the cutter B so as to force the wire against the cutting-edge of the groove *d*, and thereby cut away a portion of it. The portion cut away and left in groove *d* passes through a hole directly under that groove. (See Figs. 5 and 6.)

Other forms of nails than that shown may be formed by my device, the main novelty of which resides in the chamber formed by the two grooves *b d*, which, when together, form a chamber to receive the wire, and which also act as cutters to cut away so much of the short section of wire as is required to be cut away to give the desired form to the nail.

In practice the groove *d* is best made wider at one end than at the other, as shown in the drawings, (see particularly Fig. 9, which is a diagram for illustrating this,) so as to give a shearing-cut to the cutting-edge $d^2$ of the groove $d$. If the groove $d$ were the exact counterpart of groove $b$ more power would be required to cut away portions of the wire section than if the cutting-edge acts successively upon different parts of the wire.

I prefer to clamp cutter B in its carrier B', as shown in Fig. 3, and to hold cutter D between the two abutments $d^3\ d^4$, as shown in Figs. 5 and 6. This is for ease of adjustment, and also because the cutters A, B, and D require to be changed for each size of wire.

The means shown for moving cutter B are the same as are described in my Patent No. 231,149, above referred to, as is also the casing F.

What I claim as my invention is—

1. In combination, the cutting devices B and D, formed or provided with the grooves $b$ and $d$, adapted to receive the wire blank and to cut away a portion from the side of the wire blank, as described.

2. In combination, the cutting devices A, B, and D, the first formed with the holes $a$ and $a'$ for the wire and driver, respectively, the second formed with the groove $b$, and the third with the grooves $d$ and $d'$, all arranged and operating substantially as described.

ORRIL R. CHAPLIN.

Witnesses:
D. C. KNOWLTON,
J. E. MAYNADIER.